UNITED STATES PATENT OFFICE.

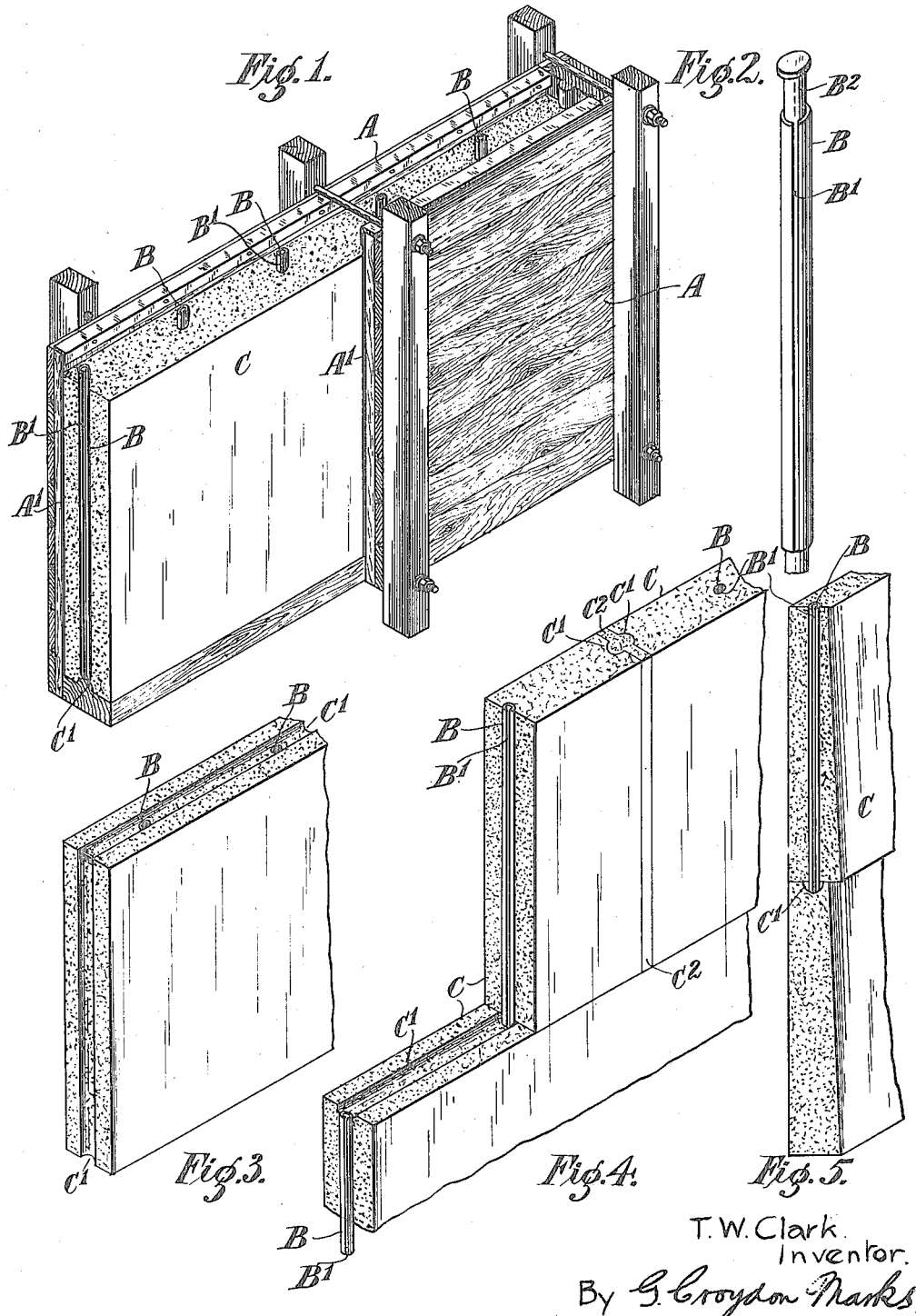

THOMAS WILLIAM CLARK, OF EAST MALVERN, VICTORIA, AUSTRALIA.

FORMATION OF CONCRETE CONSTRUCTIONS.

1,180,472.

Specification of Letters Patent.

Patented Apr. 25, 1916.

Application filed June 2, 1915. Serial No. 31,749.

*To all whom it may concern:*

Be it known that I, THOMAS WILLIAM CLARK, subject of the King of Great Britain, residing at Lower Malvern Road, East Malvern, in the State of Victoria, Commonwealth of Australia, have invented certain new and useful Improvements in the Formation of Concrete Constructions, of which the following is a specification.

This invention relates to certain improvements in the formation of concrete constructions and refers more especially to the manufacture of concrete blocks or slabs for building purposes and the like.

Though this invention is herein described as being primarily applicable to the manufacture of blocks or slabs for building purposes it will be well understood that it is equally applicable to the manufacture of blocks or slabs for any other purpose and also to the manufacture of pipes, poles, paving slabs sleepers and the like.

Hitherto concrete constructions have been formed by the concrete being mixed into a plastic condition with water and then molded into the required form. According to my present invention concrete constructions are formed by the requisite ingredients being mixed and filled into the molds or forms in a dry state then saturated with water or suitable aqueous solution in the molds themselves, means being provided for the thorough distribution of the water or aqueous solution throughout the mass. By this method of forming concrete I find that a more uniform construction is secured free from stratification voids and cavities with better faces while the product is practically watertight.

In the formation of concrete constructions according to this invention I take a certain amount of sand or a mixture of sand and aggregates or other suitable material and after the removal of all moisture I mix the said material in a dry condition with the requisite amount of Portland or other cement according to the relative proportions necessary. I find it unnecessary to reject any of the finer sand but such fine material is desirable and assists in giving a good surface to the finished product. The dry mixture is then well mixed in any suitable machine to insure that every particle of the material will come into contact and be associated with its due proportion of cement and that homogeneity and perfect admixture is secured. The dry mixture is then transferred to suitable molds or forms for giving the required shape to the construction and the same is then saturated with water or a suitable aqueous solution means being provided for the thorough distribution of the said water or aqueous solution through the mass.

The invention will now be more fully described aided by a reference to the accompanying sheet of drawings in which—

Figure 1 is a perspective view in section of a portion of a mold showing the formed block or slab therein. Fig. 2 is a view of portion of the metal water circulation tubes with the core therein. Fig. 3 is a perspective view of a portion of a slab or block having horizontal and vertical semi-circular grooves for forming the joints. Fig. 4 shows the means devised for making the vertical and horizontal joints, while Fig. 5 shows blocks or slabs adapted for outside walls.

When forming blocks or slabs or the like according to this invention the molds A are made of the required shape of any approved material such as wood in such manner that they can be readily erected and dismantled. These molds are made practically watertight and may be lined with a material A' (such as fibrous cement) for giving a smooth surface finish to the resultant products. The inside face of the mold or form is painted or coated with a wash of infusorial earth (kieselguhr) in water containing gum arabic or some such adhesive. This coating or wash prevents the concrete from adhering to the face of the molds or forms.

Within the molds or forms I provide a number of channels or passages for the distribution of the water throughout the mass. These channels preferably consist of a number of metal conduits B or pipes or tubes having longitudinal slots B' or apertures for their whole length or holes or perforations at intervals. In practice I find that metal conduits with the joint opened to the required extent to form a longitudinal aperture B' as shown in Fig. 2 (say to about one eighth of an inch) well answer the purpose. These conduits B are arranged vertically or horizontally or both vertically and horizontally or any other convenient position within the mold and to prevent the dry material entering the said pipes or tubes B through the slots or perforations B' I provide a removable core $B^2$ within the same which may consist of a metal rod or an india rubber tube or such like. The dry mixture of cement and sand or other material is tamped down into the mold while the same is being filled. If necessary the said mold may be subjected to a series of blows by machinery or otherwise for compacting the material therein while pressure may be imparted to the top of the material in the mold to insure that it is brought down to a compact and uniform mass. The cores $B^2$ may then be withdrawn from the tubes or passages B and water or a suitable aqueous solution is conveyed to the mold A in such manner that it enters the said distributing conduits or passages B and is diffused through the apertures $B^2$ throughout the whole mass or the whole mold A may be immersed in water or aqueous solution. Additional quantities of water are added from time to time to insure a thorough saturation of the mixture, and the molds A are then left for the requisite period for the concrete to set.

The aforesaid tubes or conduits B themselves provide metallic reinforcement for the concrete, but additional reinforcement may be introduced being set up in the molds in any desired form. If it is desired that no reinforcement of any description shall be incorporated in the concrete construction the metal tubes or conduits B may be dispensed with and the passages for the distribution of the water obtained by tubes or permeable material such as metal gauze or fabric the same being formed by means of a straight rod of the required size being wound around or wrapped around with the gauze or fabric the said rod being withdrawn after the dry mixture is charged into the mold.

When this invention is applied to the formation of blocks or slabs for the building of walls the ends and the upper or top faces are preferably formed with longitudinal semicircular grooves $C'$ for the reception of mortar or plastic cement which forms a bond for jointing the same. The aforesaid metal conduits or tubes B of the upper block are allowed to project from the under face for a short distance into the groove $C'$ of the lower block so that when assembled together they thus form a bond between the two blocks or slabs the said groove $C'$ and the face being charged with mortar or plastic concrete as shown in Figs. 4 and 5. In making the vertical joints between the slabs or blocks C the said slabs or blocks are placed in position a suitable distance apart with the semicircular grooves $C'$ facing each other when the space between the blocks is filled with cement or other plastic material $C^2$ as shown in Fig. 4.

When the slabs or blocks C are adapted for outside walls the outer faces of the said blocks or slabs may be formed of a gradually increasing thickness from the top to the bottom as shown in Fig. 5, and when set in place in the construction the lower edge of one overlaps or overhangs the top edge of the next block below it. In this way a projection for the joint is effected, the inside face being made flush and even for a finished wall.

I claim—

1. A process, substantially as herein described, of producing a concrete article, which comprises filling a mold with a substantially uniform mixture of dry solid aggregate and hydraulic cement, introducing an aqueous liquid from the interior of the mold, at a point remote from the surfaces of the mold, until sufficient water has been introduced for the setting of the cement, and then allowing the article to set in the mold.

2. A process, substantially as herein described, of producing a concrete article, which comprises interiorly coating the lining of a mold with a wash containing finely divided solid material and an adhesive, thereafter filling said mold with a substantially uniform mixture of dry solid aggregate and hydraulic cement, and reinforcing materials, introducing an aqueous liquid from the interior of the mold, at a point remote from the surfaces of the mold, until sufficient water has been introduced for the setting of the cement, and then allowing the article to set in the mold.

In testimony whereof I have affixed my signature in presence of two witnesses.

THOMAS WILLIAM CLARK.

Witnesses:
  CHAS. A. HACK,
  G. L. CULLEN.